United States Patent

[11] 3,593,408

| [72] | Inventor | Raymond W. Walker<br>Huntington Beach, Calif. |
|---|---|---|
| [21] | Appl. No. | 779,004 |
| [22] | Filed | Nov. 26, 1968 |
| [45] | Patented | July 20, 1971 |
| [73] | Assignee | Deep Oil Technology, Inc.<br>Long Beach, Calif. |

[54] APPARATUS AND METHOD OF MAKING UNDERWATER PIPE CONNECTIONS
9 Claims, 6 Drawing Figs.

[52] U.S. Cl. .................................................. 29/429,
29/200 P, 29/240
[51] Int. Cl. ................................................. B23p 19/00,
B23p 19/04
[50] Field of Search .......................................... 29/429,
240, 400, 200 A, 200 P

[56] References Cited
UNITED STATES PATENTS
2,760,393   8/1956   Stough ........................   81/54
2,885,919   5/1959   Carlson ......................   81/56
3,372,461   3/1968   Tesson .......................   29/429

*Primary Examiner*—Thomas H. Eager
*Attorney*—Miketta, Glenny, Poms and Smith

ABSTRACT: An apparatus and method for making an underwater pipe connection including one or more power wrench means adapted to be universally or multidirectionally positioned for connecting, exemplarily, a pipeline to a wellhead. The apparatus includes a pair of such wrench means for transporting and positioning a spacer pipe between a wellhead and the end of a pipe or fluid flow line spaced therefrom and cooperable with rotatable coupling means carried on opposite ends of such a spacer pipe and cooperable with a fixed connector fitting on such a wellhead and on the end of the pipe flow line; each power wrench means being adapted to rotatably drive a collar carried on a pipe end.

PATENTED JUL 20 1971 3,593,408
SHEET 1 OF 2
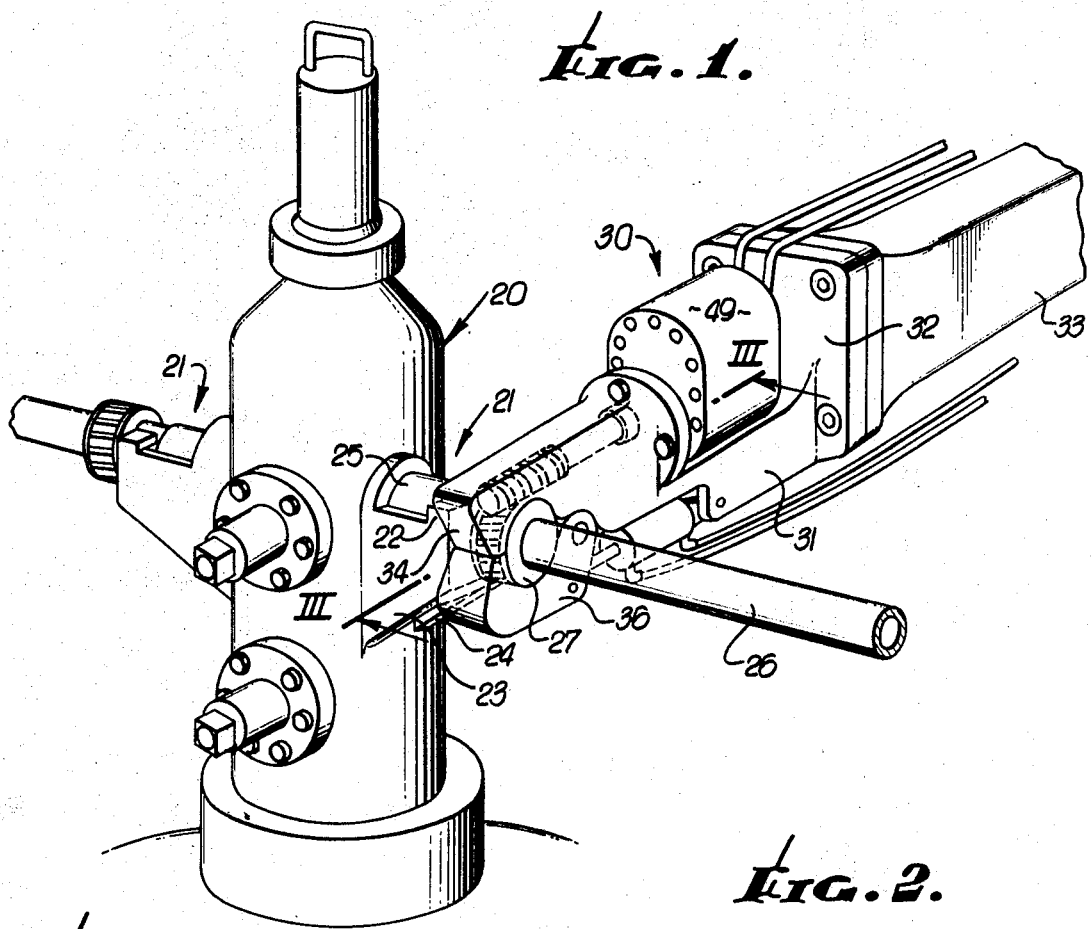
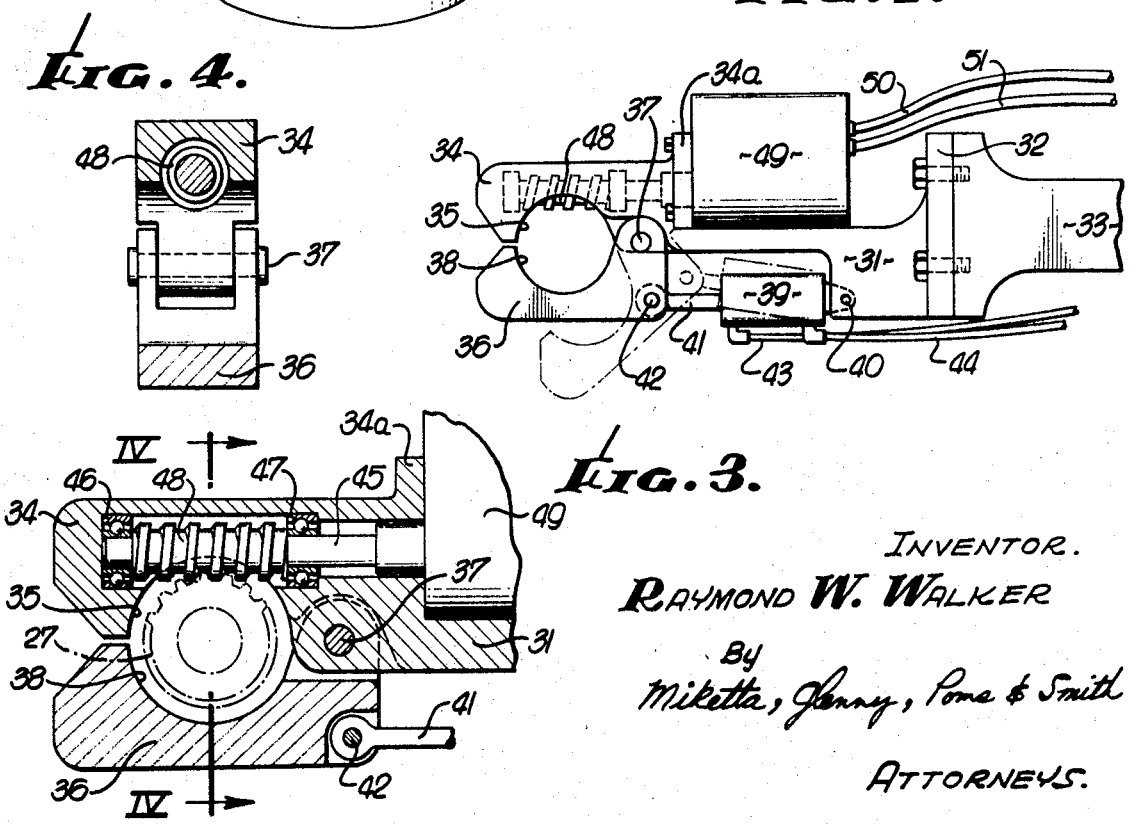
INVENTOR.
RAYMOND W. WALKER
By
Miketta, Glenny, Poms & Smith
ATTORNEYS.

INVENTOR.
RAYMOND W. WALKER
By
Miketta, Glenny, Poms & Smith
ATTORNEYS.

APPARATUS AND METHOD OF MAKING UNDERWATER PIPE CONNECTIONS

In prior proposed connections between pipe ends, flanged and clamp-type fittings have been employed. However, while such fittings can be made in a deep water subsurface connection between an offshore subsea wellhead and a production pipeline extending along an ocean floor, such deep water environment renders difficult any manually made connection and even making a flanged fitting connection with existing power equipment becomes time-consuming, awkward and very costly. Prior proposed power tong constructions were not suitable for operation close to a wellhead for making a pipe connection adjacent to the wellhead surface.

To overcome the disadvantages of such prior types of connections, a new type of wellhead pipe connector means has been conceived and is described and claimed in my U.S. Pat. No. 3,502,354. Generally, this connector means comprises an externally threaded pipe end portion and an internally threaded collar for slidably and threadedly receiving the pipe end portion; the collar being constrained against axial movement by suitable supporting wellhead means and has a collar portion including external gear teeth for engagement with a worm so as to rotate the collar and thereby axially advance or retract the pipe with respect to the wellhead opening with which the pipe is to be connected.

While the above-described wellhead pipe connector means has been found to overcome many of the disadvantages of prior proposed connectors, the submerged water environment also gave rise to the need for a suitable underwater power-operated tool useable with such connector means as by a diver manually or remotely handling the power wrench from a diving shell, or by remote actuation through robot means.

It is an object therefore of the present invention to provide a novel apparatus and method utilizing power wrench means adapted for making pipe connections under conditions where remote control of the wrench means is desirable as in subsea environment.

Another object of the present invention is to disclose and provide an apparatus and method utilizing a power-operated wrench means which may be readily removably positioned in driving engagement with a rotatable member such as a collar or a nutlike element.

It is another object of the present invention to provide an apparatus and method utilizing a power wrench of the above-described type which is easily manipulatable in a submerged water environment and may be entirely remotely operated.

Generally stated, in the apparatus and method embodying the present invention a power wrench for use with a connector may include a rotatable external gear toothed member, the wrench including a stationary jaw, a pivotal jaw, piston and cylinder means for opening and closing the pivotal jaw, a worm member rotatably supported within one of the jaws for engaging the gear toothed member when received between the jaws, and means for rotating the worm member so as to rotate the gear-toothed member.

The invention also contemplates an apparatus and method wherein a wellhead and a pipe to be connected thereto may be provided with fixed coupling or connector receptor means, each cooperable with a rotatable member to be driven by one of the spaced power wrench means whereby a spacer pipe transported and positioned by a pair of said wrench means may be first coupled to the end of the pipeline and then coupled to the wellhead fitting. The apparatus of the invention contemplates that the pair of wrench means may be moved along the x, y, and z axes for multidirectional positioning of the wrench means and to precisely measure the distance between the wellhead fitting and the pipeline fitting so that said wrench means may function as a template means for determining the length of the spacer or jumper pipe required to make the connection and also relative positions of jumper pipe end fittings with respect to each other.

In the method of practicing the present invention in which an underwater pipe connection is made between a connector receptor means which receives a pipe end upon which a rotatable coupling member is carried, a pipe length with the coupling means thereon may be positioned in operative engagement with the power wrench means and may be transported to the vicinity of the connector receptor means for engagement of the rotatable coupling member therewith. Rotation of the coupling member by the power wrench means makes a pressure-type connection between the pipe end and the connector receptor means. A pair of such power wrench means carried on a diving means readily transports the pipe length to the location of the connector receptor means, the pair of power wrench means including means for multidirectional movement of each power wrench means for readily adjusting each pipe end to an associated connector receptor means. In the drawings:

FIG. 1 is a perspective view of a portion of a wellhead including a wellhead pipe connector means and an exemplary power wrench constructed in accordance with the present invention;

FIG. 2 is a side elevation view of the power wrench;

FIG. 3 is a fragmentary sectional view of the power wrench taken along a vertical longitudinal plane III–III of FIG. 1;

FIG. 4 is a transverse sectional view taken along vertical plane IV–IV of FIG. 3;

Figure 5:
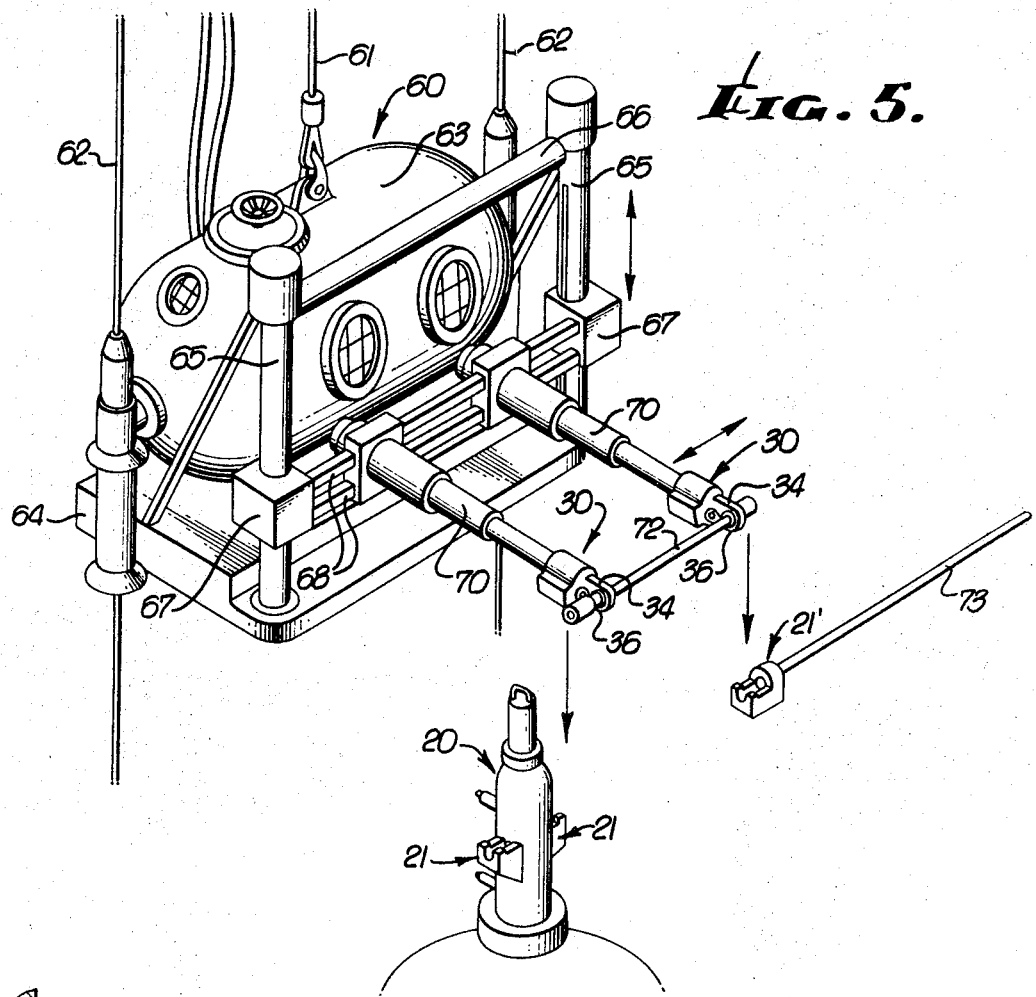
Figure 6:
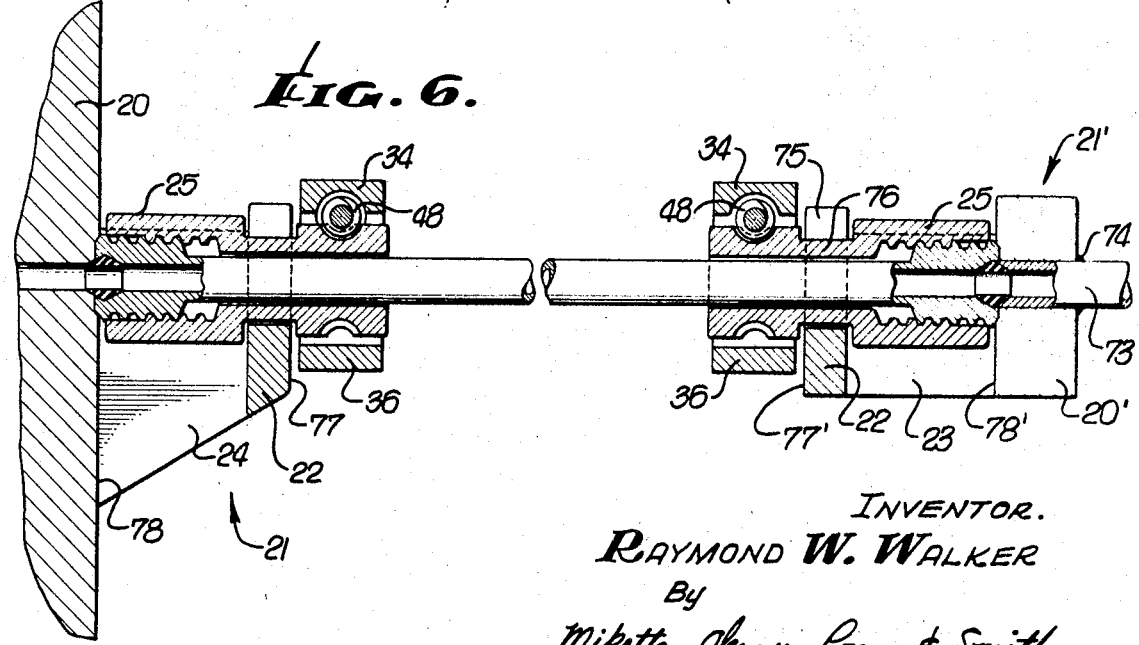

FIG. 5 is a fragmentary perspective view of a subsea diving bell and a portion of a wellhead and a production line to be connected thereto, the diving bell having mounted thereon power wrench means of this invention and illustrating transport, measuring, and positioning features of this apparatus; and FIG. 6 is a fragmentary sectional view taken in a vertical plane bisecting the axis of the pipeline and wellhead fitting to further show a method of making a pipe connection.

Referring now to the drawing, there is shown a wellhead 20 including a wellhead pipe connector indicated generally at 21. The wellhead pipe connector 21 may include a wall 22 laterally spaced from wellhead 20 and supported by arms 23, 24. Wall 22 may be provided with a U-shaped opening for receiving a rotatable collar 25 having an internally threaded end portion for receiving an externally threaded cylindrical member secured to the end of pipe 26. The rearward end portion of collar 25 is provided with external gear teeth 27 for engagement with a power wrench embodying this invention for connecting pipe 26 to wellhead 20. A more detailed description of such a wellhead pipe connector means may be found in my U.S. Pat. No. 3,502,354.

While a power-actuated wrench means embodying my present invention is described with reference to the aforesaid connector means, it will be understood that such connector means is used as a convenient example and that the power wrench means of this invention may be employed with connector or coupling means in which the wrench means may approach, engage, and disengage a coupling, collar, or nut from a lateral or nonaxial pipe direction.

An exemplary tool or power wrench, comprising the subject of the present invention, is generally indicated at 30. Power wrench 30 comprises a body member 31 having a flange 32 for mounting the power wrench to an arm 33 which may be connected to a diving bell or other underwater vessel. Body member 31 supports a stationary extension or jaw 34 having a generally semicircular downwardly facing recess or cutout portion 35. A complementary movable jaw 36 is pivotally mounted on body 31 through a pivot pin 37 and includes an opposed complementary generally semicircular recess or cutout portion 38.

A hydraulic piston and cylinder assembly 39 is pivotally supported beneath body member 31 through a pivot pin 40. An actuating piston rod 41 extends from the hydraulic piston and cylinder assembly 39 and is pivotally connected to one end of jaw 36 through a pin 42 at a location spaced below the jaw pivot pin 37. Hydraulic lines 43, 44 are connected to double-acting hydraulic piston and cylinder assembly 39 for selectively reciprocating the piston so as to open and close jaw 36 and are connected at the other end to a pressurized hydraulic source located in, for example, the diving bell or a surface vessel. It will, of course, be understood that the jaw-actuating means may be pneumatically powered or may comprise a suitable mechanical-actuating device.

As seen best in FIG. 3, the fixed jaw 34 supports a rotatable shaft 45 journaled in bearings 46, 47, the shaft carrying a worm member 48. A portion of worm member 48 extends into and traverses along a chord of the semicircular opening defined by the recess 35 of the stationary jaw 34. When the jaws are closed, as shown in FIG. 3, worm member 48 is in threaded engagement with external nut 27.

Power wrench 30 also includes means for rotating the worm member which may comprise a hydraulic motor 49 mounted on body 31. For this purpose body member 31 may include an upwardly opening motor receiving space provided between flange 32 and an upstanding flange 34a from which projects stationary extension jaw 34. Suitable stud bolts may secure motor 49 to flange 34a. Motor 49 is provided with hydraulic lines 50, 51 connected to a pressurized hydraulic source located, for example, in a diving bell.

In operation, when pipe 26 and collar 25 are properly positioned for connection to wellhead 20, power wrench 30 may be laterally positioned with respect to pipe 26 with jaw member 36 in retracted or down position so that arm 33 and power wrench 30 may be laterally advanced to position the stationary extension jaw 34 above and over the external gear teeth on the collar 25. The stationary jaw 34 may then be lowered so that the threads of worm member 48 are in meshed engagement with the gear teeth on collar 25. Upon such engagement movable jaw 36 may be pivotally swung beneath the pipe 26 and then upwardly into its fully closed position. In such closed position the recesses 35 and 38 substantially encircle threaded collar portion 27 with sufficient tolerance therebetween so that collar 25 may rotate within the wrench opening. Actuation of fluid motor 49 rotates worm member 48 to turn collar 25 and to provide a tight sealed connection to the wellhead element as described in my copending application. Fluid motor 49 may turn worm member in either direction so that the collar 25 may be tightened or loosened.

When it is desired to remove power wrench 30 form collar 25 the hydraulic cylinder means 39 may be actuated in the opposite direction to draw movable jaw 36 downwardly and rearwardly about its pivotal connection 37. Upon opening jaw 36 the power wrench 30 may be simply removed by lifting upwardly and then moving the wrench laterally from the pipe 26.

It should be noted that in such pivotal movement of jaw 36 the fluid cylinder means 39 readily adjusts itself to various positions of jaw 36 because of its pivotal connections at 42 and at 40. The fluid motor 49 and cylinder means 38 are mounted on the power wrench above one another and quite closely to the jaw members. Thus, when the power wrench is engaged with the pipe the moment arm produced by the fluid cylinder means and the fluid motor means is relatively short and the turning moment of the power wrench about a pipe 26 is reduced and support of the power wrench in a substantially horizontal position as shown may be readily provided.

It should also be noted that the projected longitudinal axis of support arm 33 passes slightly above the pivotal axis of movable jaw 36 and that such pivotal axis lies parallel to and in approximately the same plane as the axis of the circular opening formed by recesses 33 and 38. Thus, maneuverability of the power wrench by remote or robot means is facilitated with respect to properly aligning and positioning the stationary extension jaw 34 with respect to a collar. Since the worm member 48 is substantially enclosed by the stationary jaw extension except for the portion which traverses recess 35, it will be readily apparent that collection of foreign particles or foreign matter in the worm member is reduced to a minimum and possible jamming of the gear is thus avoided.

In FIGS. 5 and 6 there is illustrated an underwater diving bell 60 equipped with a air of power wrench means 30 embodying the construction described above. The diving bell, generally indicated, may be raised and lowered to selected depths by a cable 61 and may be guided in its diving path by suitable guide cables 62 at opposite ends of the diving shell 63.

The diving shell 63 may be supported on a suitable frame means 64 provided with a pair of spaced upstanding columns 65 interconnected at their top ends by a horizontal member 66 and at their bottom ends by frame 64. Columns 65 provide a slidable mount for vertically movable heads 67 which are interconnected by a pair of spaced rails 68 upon which may be slidably mounted laterally movable crossheads 69 each carrying forwardly projecting extendible and retractable arms 70 carrying wrench means 30. Crossheads 69 may be independently driven by suitable means (not shown) and may be moved towards and away from each other. The vertical heads 67 are movable by suitable drive means (not shown) in a vertical direction.

In this example the power wrench means 30 are supported by telescopically arranged extendible and retractable hydraulically operated arm means 70 so that the wrench means 30 may be moved toward and away from the diving shell 63. The pair of spaced power wrenches 30 may support and carry a spacer or jumper pipe section 72 between their stationary jaws 34 and movable jaws 36. Each end of jumper pipe 72 may carry a rotatable member or collar 25 with external gear teeth thereon in meshed engagement with worm 48 of the wrench means 30.

The pipeline 73 ends in spaced relation to wellhead 20 is provided with a fixed stationary fitting or pipe connector 21'- said connector being weld as at 74 to the pipe 73. The wellhead connector 21 is of essentially the same construction as the pipeline connector, and each includes a wall 22 spaced from a base wall 20' by longitudinally extending arms 23 and 24. Wall 22 is provided with a U-shaped opening 75 for receiving a neck portion 76 of collar 25.

In operation pipeline 73 is laid with its end in spaced relation to a selected wellhead 20 and in substantial alignment with pipe connector means 21 provided on wellhead 20. The space between the end of pipe 73 and the wellhead must be determined to interconnect pipe 73 and wellhead 20. For this purpose apparatus 60 with the universally movable spaced wrench means 30 may be lowered without a jumper pipe 72 thereon so that the wrench means 30 may be interposed between outer faces 77 of walls 22 on the pipeline connector and wellhead connector. The wrench means 30 may then be moved apart until the surfaces 77 of said walls are contacted. The spacing of the connector fittings on the wellhead and the end of pipe 73 are thus measured and determined. The diving shell 60 is then raised to the surface and lifted onto the deck of the vessel carrying the diving bell. A jumper pipe 72 may then be accurately cut and measured to length because the distances between the outer faces 77 and 77' and the wall surfaces 78 and 78' are known from prior construction and measurement of connector means 21. Jumper pipe 72 may be fitted with external threads at opposite ends and a rotatable collar 25 in threaded engagement with the threaded pipe ends. The jaw means 34 and 36 of each wrench means 30 may be opened and placed in placed in operative engagement with the external gear teeth of collars 25. Spacing between the arms 70 is not changed during this procedure.

Jumper pipe 72 positioned and held by jaws 30 may then be lowered by the diving shell 63 until the rotatable collar means 25 are received within the U-shaped openings 75 of the spaced connector means 21. The wrench means 30 adjacent to pipeline 73 may then be operably driven so as to rotate collar 25 to move the spacer pipe into tight, sealed relation with the end of the pipe 73, the resilient seal therebetween being placed under suitable sealing pressure. After making the connection to pipe 73, the opposite end of jumper pipe 72 may be connected in similar manner to the wellhead connector means 21 of the wellhead 20. After both pipe connections have been completed, the movable jaws 36 may be released and the wrench means 30 withdrawn and the diving shell and power wrench means returned to the surface.

It will thus be apparent that he power wrench means 30 of the present invention together with the wellhead connector means 21 as described in my U.S. Pat. No. 3,504,354 provide an effective system and method for facilitating the making of pipe connections underwater by mechanical power means and without the necessity of manual operations by a diver.

From the above description it will be apparent that the exemplary power wrench provides a suitable tool for use in making a connection with a wellhead pipe connection and which requires little adjustment and initial positioning so that the pipe connection may be performed from a remote location as is often desirable in subsea well operations. It will be understood that the power wrench of this invention may be readily adapted for use with other rotatable members provided with external gear teeth which can be readily engaged by a worm-type power wrench device as above described.

It will be obvious that many modifications and variations of the present invention are possible in light of the above teachings. For example, it will be readily apparent to those skilled in the art that means other than the hydraulic motor may be used for rotating the worm member. It is therefore to be understood that within the scope of the appended claims the invention may be practiced otherwise than as specifically described.

I claim:

1. In an apparatus for making an underwater pipe connection between two spaced connector means each including receptor means for receiving a rotatable member, the provision of:
   a diving means adapted to be lowered into the vicinity of said spaced connector means;
   at least a pair of power wrench means carried by said diving means and each wrench means being positionable in supporting relation to a jumper pipe and in cooperable engagement with a rotatable member on said pipe;
   and means on said diving means and connected with said wrench means for three-dimensional movement of said power wrench means with respect to said diving means and said connector means for positioning said pipe and rotatable members in said receptor means for making said pipe connection.

2. In an apparatus as stated in claim 1 wherein each power wrench means includes:
   a drive member for driving a rotatable member on said jumper pipe;
   said rotatable member being received within receptor means on said connector means and cooperable therewith for making a pressuretight connection.

3. An apparatus as stated in claim 1 wherein said spaced connector means include opposed faces;
   said pair of power wrench means each include a face adapted to be moved into abutting contact with said face on a connector means;
   whereby said spacing of said power wrench means when in contact with said faces of said connector means precisely determines the length of jumper pipe to be installed between said spaced connector means.

4. A method of making an underwater connection between a wellhead having a wellhead connector receptor means and a pipeline end spaced therefrom having a connector receptor means, the steps of:
   positioning a pair of power wrench means into alignment with and into contact with opposed faces of said connector means to determine length of jumper pipe;
   cutting a jumper pipe to length in accordance with said measurement and providing said each end of said jumper pipe with a rotatable coupling member for cooperation with said connector means;
   positioning said jumper pipe with said coupling means in operative engagement with said power wrench means;
   transporting said jumper pipe while in operative engagement with said wrench means to the vicinity of said wellhead and pipe end;
   engaging said rotatable coupling members with said spaced connector means;
   rotating one of said rotatable coupling members to threadedly make a connection with the connector means; and
   rotating the other rotatable coupling means to threadedly make a connection with its respective connector means.

5. In a method of making underwater pipe connections in which spaced connector receptor means are provided for receiving therebetween a pipe length having pipe ends on which rotatable coupling members are carried, the steps of:
   cooperably engaging said coupling members on said pipe length by spaced power wrench means for lifting and holding said pipe length;
   moving said pipe length by said power wrench means to the location of said spaced connector receptor means;
   engaging said rotatable coupling members with said spaced connector means;
   rotating one of said rotatable coupling members to threadedly make a connection with the connector means; and
   rotating the other rotatable coupling means to threadedly make a connection with its respective connector means.

6. In a method as stated in claim 5 including the step of moving said wrench means in unison in three-dimensional movement to position said pipe length with respect to said spaced connector means.

7. In a method as stated in claim 5 including the step of mounting the power wrench means on a diving means for transporting and lowering the pipe length to the location of the connector means.

8. In a method of making underwater pipe connections in which at least one connector receptor means is provided for receiving a pipe end on which a rotatable coupling member is carried, including the steps of:
   positioning said pipe length with said coupling means at one end thereof in operative engagement with said power wrench means;
   transporting said pipe length while in operative engagement with said wrench means to the vicinity of said connector receptor means;
   engaging the rotatable coupling member to with said connector receptor means; and
   rotating said rotatable coupling member to make a pressuretight connection between said pipe end and said connector receptor means.

9. In an apparatus for making an underwater pipe connection including a pair of spaced connector receptor means for receiving pipe ends of a pipe length, the combination of;
   a rotatable coupling member carried on each end of the pipe length;
   a pair of power wrench means, each operatively engaged with one of said rotatable coupling members for supporting said pipe length and for rotating said coupling members; and
   means, including a diving means, carrying said power wrench means for transporting said pipe length to the location of said connector receptor means and for positioning the rotatable coupling members in said receptor means for making a pressuretight connection between said pipe ends and said receptor means,
   said power wrench carrying means including means for multidirectional movement of said power wrench means.

UNITED STATES PATENT OFFICE
CERTIFICATE OF CORRECTION

Patent No. 3,593,408      Dated July 20, 1971

Inventor Raymond W. Walker

It is certified that error appears in the above-identified patent and that said Letters Patent is hereby corrected as shown below:

Column 2, line 68, delete [cu-] and insert --cut---;
column 2, line 69, delete [tout] and insert --out--.

Column 3, line 34, insert --the-- between "gagement" and "movable"; column 3, line 45, delete [form] and insert --from--.

Column 4, line 30, insert --which-- between "73" and "ends"; column 4, line 31, delete [21'-] and insert --21',--; column 4, line 32, delete [weld] and insert --welded--.

Column 5, line 6, delete [3,504,354] and insert --3,502,354--.

Column 6, line 48, delete [to] between "member" and "with".

Signed and sealed this 9th day of May 1972.

(SEAL)
Attest:

EDWARD M. FLETCHER, JR.      ROBERT GOTTSCHALK
Attesting Officer      Commissioner of Patents